United States Patent
Wang et al.

(10) Patent No.: US 12,367,669 B2
(45) Date of Patent: Jul. 22, 2025

(54) DOCUMENT IMAGE QUALITY DETECTION

(71) Applicant: PayPal, Inc., San Jose, CA (US)

(72) Inventors: Chao Wang, Shanghai (CN); Ke Jin, Shanghai (CN); Yunfeng Ma, Shanghai (CN); Wei Sun, Singapore (SG)

(73) Assignee: PayPal, Inc., San Jose, CA (US)

( * ) Notice: Subject to any disclaimer, the term of this patent is extended or adjusted under 35 U.S.C. 154(b) by 386 days.

(21) Appl. No.: 17/662,111

(22) Filed: May 5, 2022

(65) Prior Publication Data
US 2023/0334846 A1    Oct. 19, 2023

(30) Foreign Application Priority Data
Apr. 19, 2022    (WO) ................ PCT/CN2022/087567

(51) Int. Cl.
*G06V 10/98*    (2022.01)
*G06V 10/20*    (2022.01)
(Continued)

(52) U.S. Cl.
CPC ............ *G06V 10/993* (2022.01); *G06V 10/20* (2022.01); *G06V 10/7715* (2022.01);
(Continued)

(58) Field of Classification Search
CPC .. G06V 10/993; G06V 10/20; G06V 10/7715; G06V 10/774; G06V 10/82; G06V 10/945; G06V 30/413
See application file for complete search history.

(56) References Cited

U.S. PATENT DOCUMENTS

2018/0108101 A1* 4/2018 Rodriguez ........... G06K 7/1417
2018/0225869 A1* 8/2018 Upendran ............... G06T 17/00
(Continued)

FOREIGN PATENT DOCUMENTS

CN    111340123 A    6/2020
CN    112365451    *    2/2021
(Continued)

OTHER PUBLICATIONS

Wang, X., Wang, K. & Lian, S. A survey on face data augmentation for the training of deep neural networks. Neural Comput & Applic 32, 15503-15531 (2020). https://doi.org/10.1007/s00521-020-04748-3 (Year: 2020).*
(Continued)

*Primary Examiner* — Andrae S Allison
(74) *Attorney, Agent, or Firm* — Kowert, Hood, Munyon, Rankin & Goetzel, P.C.

(57) ABSTRACT

Techniques are disclosed relating to automatically determining image quality for images of documents. In some embodiments, a computer system receives an image of a document captured at a user computing device. Using a neural network, the computer system analyzes the image to determine whether the image satisfies a quality threshold, where the analyzing includes determining whether one or more features in the image used in an authentication process are obscured. The computer system transmits, to the user computing device, a quality result, where the quality result is generated based on an image classification output by the neural network. Automatically determining whether a received image of a document satisfies a quality threshold may advantageously improve the chances of a system being able to complete an authentication process quickly, which in turn may improve user experience while reducing fraudulent activity.

20 Claims, 8 Drawing Sheets

(51) Int. Cl.
  *G06V 10/77*   (2022.01)
  *G06V 10/774*  (2022.01)
  *G06V 10/82*   (2022.01)
  *G06V 10/94*   (2022.01)
  *G06V 30/413*  (2022.01)

(52) U.S. Cl.
  CPC ............ *G06V 10/774* (2022.01); *G06V 10/82* (2022.01); *G06V 10/945* (2022.01); *G06V 30/413* (2022.01)

(56) References Cited

U.S. PATENT DOCUMENTS

| | | | |
|---|---|---|---|
| 2021/0042930 A1 | 2/2021 | Ceccaldi et al. | |
| 2021/0350516 A1 | 11/2021 | Tang et al. | |
| 2022/0092776 A1* | 3/2022 | Ehlers | G06T 7/00 |
| 2022/0301333 A1* | 9/2022 | Choi | G06V 10/82 |
| 2023/0061725 A1* | 3/2023 | Khan | G06F 16/93 |
| 2023/0419715 A1* | 12/2023 | Zhang | G06V 30/41 |

FOREIGN PATENT DOCUMENTS

| | | | |
|---|---|---|---|
| CN | 112770838 A | | 5/2021 |
| CN | 114299358 | * | 4/2022 |
| CN | 114299358 A | | 4/2022 |

OTHER PUBLICATIONS

Längkvist, Martin, et al. "Interactive learning with convolutional neural networks for image labeling." International Joint Conference on Artificial Intelligence (IJCAI), New York, USA, Jul. 9-15, 2016. 2016. (Year: 2016).*

Nikolaou, N., and Nikos Papamarkos. "Color segmentation of complex document images." Advances in Computer Graphics and Computer Vision: International Conferences VISAPP and GRAPP 2006, Setúbal, Portugal, Feb. 25-28, 2006, Revised Selected Papers. Springer Berlin Heidelberg, 2007. (Year: 2007).*

Samuel Dodge et al., "Understanding How Image Quality Affects Deep Neural Networks," arXiv:1604.04004v2 [cs.CV] Apr. 21, 2016; 6 pages.

Ashish Vaswani et al., "Attention Is All You Need," 31st Conference on Neural Information Processing Systems (NIPS 2017); arXiv:1706.03762v5 [cs.CL] Dec. 6, 2017; 15 pages.

Hossein Talebi et al., "NIMA: Neural Image Assessment," arXiv:1709.05424v2 [cs.CV] Apr. 26, 2018; 15 pages.

Ywan Bello et al., "Attention Augmented Convolutional Networks," arXiv:1904.09925v5 [cs.CV] Sep. 9, 2020; 13 pages.

Andrew Howard et al., "Searching for MobileNetV3," arXiv:1905.02244v5 [cs.CV] Nov. 20, 2019; 11 pages.

Alexey Dosovitskiy et al., "An Image is Worth 16X16 Words: Transformers for Image Recognition at Scale," Published as a conference paper at ICLR 2021; arXiv:2010.11929v2 [cs.CV] Jun. 3, 2021; 22 pages.

Abhishek Chhibber et al., "Federated Machine Learning Management," U.S. Appl. No. 17/357,626, filed Jun. 24, 2021, 47 pages.

Abhishek Chhibber et al., "Edge Device Machine Learning," U.S. Appl. No. 17/357,602, filed Jun. 24, 2021.

International Search Report and Written Opinion for Application No. PCT/CN2022/087567 mailed on Dec. 15, 2022, 9 pages.

* cited by examiner

Example Images 200
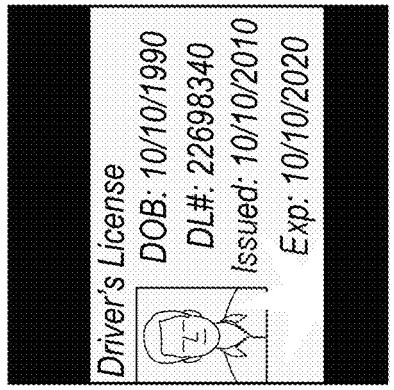
208: Large Glare Not Over Content
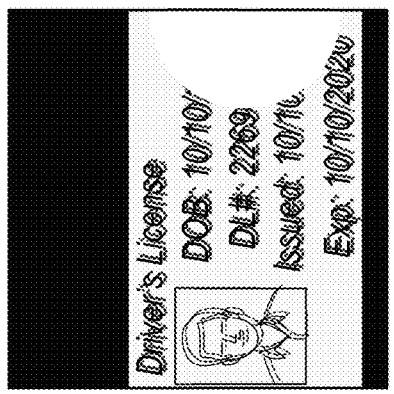
206: Blocked Content and Blur
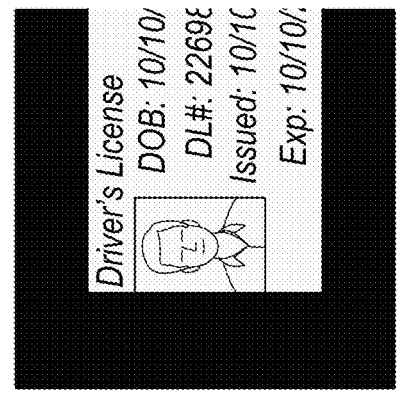
214: Partial Document
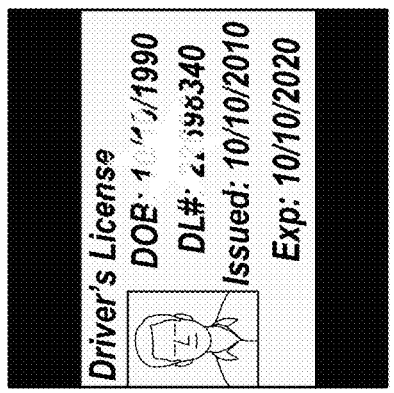
204: High Resolution and Glare
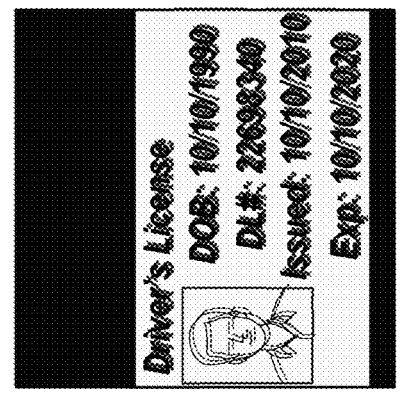
212: High Resolution and Blur
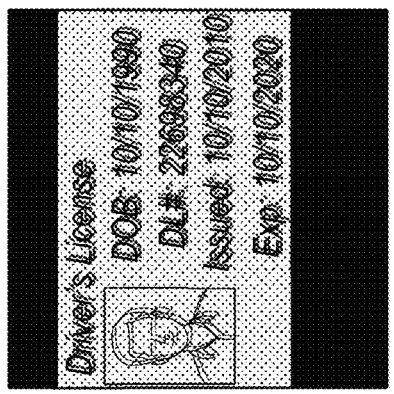
202: Low Resolution and Blur
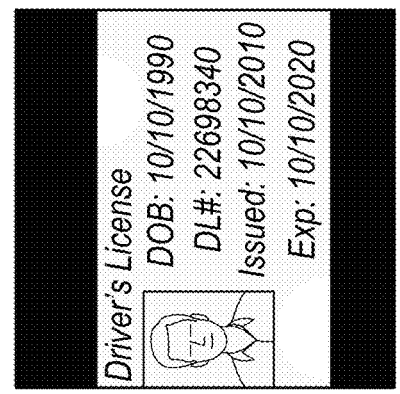
210: Block Not Over Content
Fig. 2

Example 500
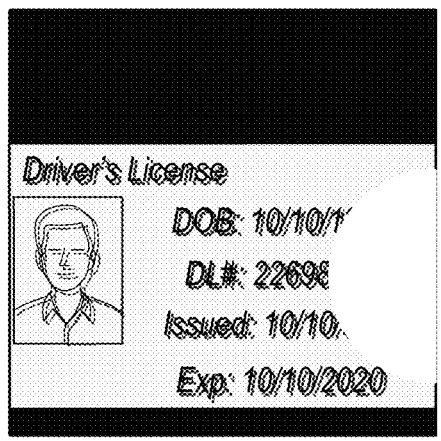
206: Blocked Content and Blur
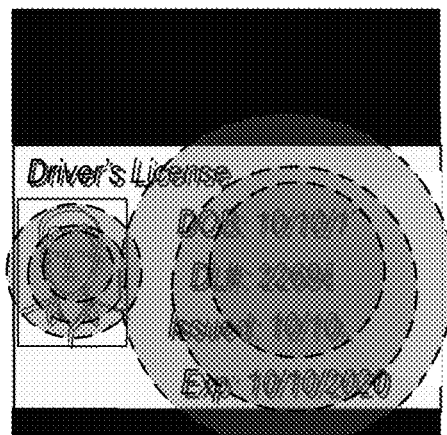
510: Model Identified Attention Map
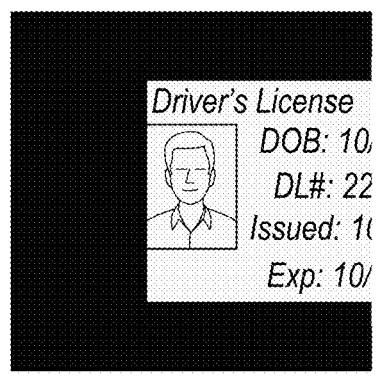
214: Partial Document
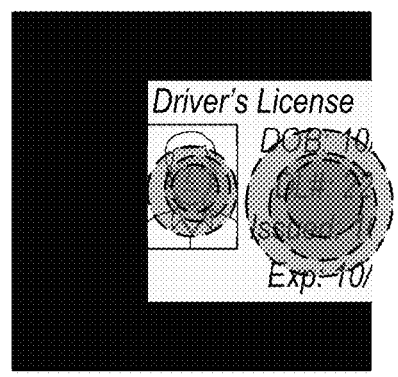
512: Model Identified Attention Map
Fig. 5

Method
700

Receive an image of a document captured at a user computing device.
710

Analyze, using a neural network, the image to determine whether the image satisfies a quality threshold, where the analyzing includes determining whether one or more features in the image used in an authentication process are obscured.
720

Transmit, to the user computing device, a quality result, where the quality result is generated based on an image classification output by the neural network.
730

*Fig. 7*

DOCUMENT IMAGE QUALITY DETECTION

PRIORITY CLAIM

The present application claims priority to PCT Appl. No. PCT/CN2022/087567, filed Apr. 19, 2022, which is incorporated by reference herein in its entirety.

BACKGROUND

Technical Field

This disclosure relates generally to processing documents, and, more specifically, to techniques for automatically identifying image quality for images of documents.

Description of the Related Art

In many situations, users may upload scanned or photographed images of documents to provide their information for review. For example, users may wish to open an account of some sort (e.g., a bank account), schedule travel plans, apply for a mortgage, or any of various other activities a user would like to participate in that involve user evaluation or authentication, or both. In one particular example situation, online customer service companies may wish to onboard new clients by verifying or authenticating documentation associated with these clients. In such situations, a company may require users to upload documents for identification and verification purposes. Once these documents are uploaded to the company's online system, operators perform tedious manual review to collect and verify information included in the documents, such as an identity of a client. In addition, if the operator determines that the quality of an image of an uploaded document inhibits extraction of necessary user information, then the operator asks the user to re-upload the documents or upload additional documentation. This process is time consuming, error prone, and often involves a long feedback time for new clients.

BRIEF DESCRIPTION OF THE DRAWINGS

FIG. 2 is a diagram illustrating example images of documents, according to some embodiments.

FIG. 5 is a diagram illustrating example portions of a document depicted in an image identified as including features for use in an authentication process, according to some embodiments.

FIG. 7 is a flow diagram illustrating a method for determining whether an image of a document satisfies a quality threshold, according to some embodiments.

DETAILED DESCRIPTION

Figure 1:
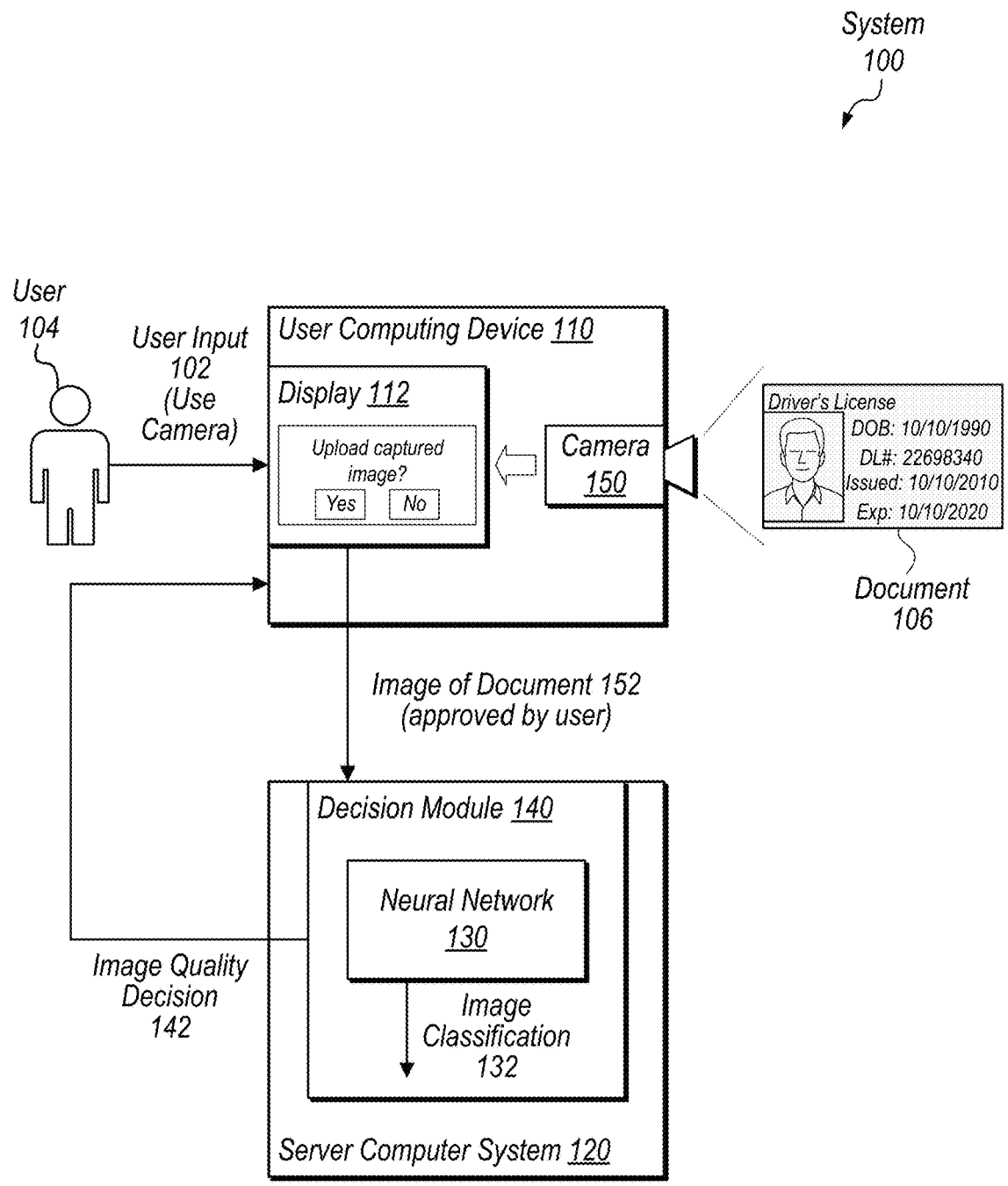
FIG. 1 is a block diagram illustrating an example server computer system configured to determine whether images of documents satisfy a quality threshold, according to some embodiments.

In many situations, authentication systems require end users to upload images of identification documents. Software systems frequently need to recognize and extract information from the documents within these images. For example, users may wish to or may be required to scan information or capture images of information and provide this information for review. As one specific example, a user may scan a document and upload the scanned document image to their personal computer. This image may then be used by some system to evaluate a user associated with the uploaded information. In many situations, information is extracted from such document images in order to satisfy a user request for some task. For example, a user may upload scanned patient files to provide an electronic copy of patient data in addition to paper or hardcopy versions. In this example, patient data may be extracted from the scanned files and stored in a database table (e.g., an excel spreadsheet). As another example, a user may wish to open a bank account and, therefore, may upload images of their pay stubs. As yet another example, a user may wish to purchase a plane ticket and may scan their passport or ID. Further, as a different example, a user may apply for a job by uploading an image of their driver's license and resume.

Traditionally, detection, marking, and extraction of data from images of documents is often an important part of onboarding new user to a user-facing system (such as a customer relationship management (CRM) system). This onboarding process, however, often involves manual examination of uploaded images (of documents) which is often tedious and error prone. For example, a system administrator of a user-facing system may manually identify an area of interest within a particular type of document, such as a user's legal name on some form of identification. In addition, system administrators may reject documents which are not supported by the system or are of poor quality. For example, an image may be rejected if the information depicted in an image of the document is illegible (e.g., if the image is blurry). In some situations, this causes delays in the review process which, in turn, may slow down the onboarding process and provide a poor experience for end users.

Traditional document image analysis systems often reject document images that are indeed satisfactory and could be used to perform authentication due to image imperfections identified in the document images. This becomes problematic and introduces inefficiencies in authentication systems when such imperfections do not block or hinder identification of important user information shown in these document images. For example, while such imperfections do not hinder the quality of essential user data depicted in the document images, they may cause traditional quality assessment systems to reject such images. Consequently, traditional techniques often have a rate of inaccurate rejection of document images. As one specific example, a high resolution image of a driver's license may include a glare, but this glare does not cover the license number and, therefore, should not impact the approval of the high-resolution image by the quality detection system. In this example, however, traditional quality detection systems would reject the high-resolution image. As one example, some feature engineering methods extract features from document images using computer vision algorithms and then make a quality judgement based on whether a specified set of patterns exist in the extracted features. Such techniques, however, often require different computer vision algorithms and thresholds to detect different patterns and use cases. Further, such techniques require multiple stages to process a single image of a document due to a given image including multiple quality issues.

Techniques are disclosed for automatically evaluating the image quality for images of documents using a machine learning model (e.g., a neural network). For example, the disclosed techniques train and execute a convolutional neural network that includes several inception and self-attention blocks using a small training set (e.g., 100, 1000, 10,000 document images) of document images that have known labels (i.e., quality or non-quality document image). For example, many of the labeled document images are labeled as non-quality images and include imperfections such as blur, glare, watermark, obstruction, low-resolution, etc. over important information in the document depicted. The set of labeled training document images also includes examples of images with such imperfections that are not located over important information and that are labeled as quality document images. Such document images are often labeled by a system administrator prior to training the disclosed neural network.

In some situations, the disclosed techniques may improve the chances of a system being able to complete authentication processes quickly. This may advantageously improve user experience by allowing users to quickly open and utilize online services (e.g., banking, leasing, etc. services). In addition, the disclosed techniques may improve user experience by quickly identifying and notifying a user regarding which portion of their document includes imperfections. As such, the disclosed techniques may also improve the security of such systems (e.g., flight websites, online banking systems, etc.) by performing authentication using document images approved by the disclosed image quality detection system. The disclosed automated document image quality detection techniques may allow for automated document quality assessment, which may remove the need for tedious manual quality evaluation and data extraction. Further, the disclosed techniques may automatically approve document images with imperfections that traditionally would have been rejected by document quality assessment systems due to the disclosed machine learning model detecting that such imperfections do not block or render important information within the depicted document illegible. For example, the disclosed neural network does not necessarily need to identify the document type depicted in an image to perform a quality assessment, but rather identifies certain high-importance areas within a document in order to identify if, and to what extent, these areas include imperfections. The disclosed machine learning techniques may advantageously provide a neural network that focuses on important portions of a document depicted in an image when determining whether this image is quality or not. In this way, the disclosed neural network may be more efficient than traditional quality evaluation systems in that it does not need to focus on all portions of document (e.g., some portions of a document may include more personally identifying information (PII) than is needed to authenticate a user associated with the document).

Example Image Processing System

FIG. 1 is a block diagram illustrating an example server computer system configured to determine whether images of documents satisfy a quality threshold. In the illustrated embodiment, system 100 includes a user computing device 110 and a server computing system 120.

User computing device 110, in the illustrated embodiment, includes a display 112 and a camera 150. User computing device 110 receives user input 102 from user 104, via display 112, requesting to capture an image of a document 106 placed in front of the camera 150 of the user's device. In response to user 104 opening an application or web browser for an online system, device 110 displays a prompt to the user, via display 112, asking the user whether they would like to upload a captured image of a document. In some situations, this prompt asks the user whether they would like to capture an image of a document instead of uploading an existing image. If the user selects "no," then the user is prompted to select one or more images among various images that may be stored on device 110 (e.g., in the camera roll of their phone). In other situations, the user is prompted to capture an image of a document in real-time. Once the user has approved an image 152 of a document (e.g., document 106) via display 112, the image 152 is transmitted to server computer system 120.

As one specific example, a document, such as document 106, depicted in an image uploaded by a user via their device may be a driver's license that includes the user's name, the driver's license number, the expiration date of the driver's license, etc. The document depicted in an image captured via device 110 may also include one or more pictures, such as a picture of the user's face. Document 106 may be any of various types of documents including one or more of the following types of documents: identifiers (driver's license, state ID, student ID, employee ID, birth certificate, marriage license, etc.), contracts (employment contracts, business contracts, etc.), payment information (credit card, payroll documents, etc.), utility bills (e.g., electricity, gas, etc.) etc. In various embodiments, user computing device 110 may be a mobile device such as a smart phone, tablet, wearable device, etc. In other situations, device 110 may be a desktop computer, for example. In such situations, device 110 may not include a camera and, as such, user 104 may upload an image of a document captured using another device (e.g., a smart phone, google glass, or any of various devices configured to scan or capture images) and shared with device 110 (in this example, device 110 may be a desktop computer).

Server computer system 120, in the illustrated embodiment, includes a decision module 140, which in turn includes a neural network 130. Server computer system 120 inputs image 152 into decision module 140, which in turn executes a trained neural network 130 to determine a classification 132 for the image 152. Based on the classification 132 output by neural network 130, decision module 140 generates an image quality decision 142 and transmits the decision to user computing device 110. For example, image quality decision 142 may indicate that the image uploaded by the user was not high enough quality. For example, if server system 120 is unable to extract information from a document 106 depicted in the image 152 to be used in an authentication procedure, then the image of the document is not high enough quality and will be rejected by system 120. As one specific example, a glare in the image 152 may block an expiration date shown in the document 106. FIG. 2, discussed in detail below, illustrates various image examples, some of which include glare points. Decision 142 may trigger an application executed via device 110 to inform the user 104 that the image was poor quality and prompt user 104 to upload a new image of document 106.

In some embodiments, server computer system 120 performs remediation operations on an image identified as low-quality by neural network 130. For example, in situations in which an image of a document includes a glare point over important information included in the document, server computer system 120 may edit the image to attempt to remove the glare from the important portion of the image. Based on successfully removing glare from the important portion of the image, decision module 140 may determine that the image now satisfies a quality threshold and sends a decision 142 to device 110 indicating that the image meets the quality requirements. For example, after removing the glare, decision module 140 may input the doctored image into neural network 130 a second time to determine whether the doctored image now receives a classification of "quality" from the network 130.

In some embodiments, neural network 130 is a convolutional neural network (CNN). For example, as discussed in detail below with reference to FIG. 4, neural network 130 may be a CNN that includes various convolution, inception, and self-attention blocks. Decision module 140 trains neural network 130 to identify whether images of documents are quality. For example, decision module 140 trains neural network 130 to output classifications 132 for images of documents received from user computing devices. Based on the output of network 130, decision module may determine whether images of documents satisfy a quality threshold. As one specific example, in some embodiments, the output of neural network 130 is a classification value on a scale of 0 to 1, with 0 indicating a high quality image and 1 indicating a low quality image. In this example, the server computer system 120 may compare a classification output by network 130 of 0.4 for a given image to a quality threshold of 0.8. In this example, the given image does not satisfy the quality threshold and, therefore, decision module 140 determines that the image is a low quality image (and thus may reject the image and the user may be asked to upload a new, higher quality image). In some embodiments, neural network 130 outputs a binary value of either 0, indicating that this image is a high quality image or a 1, indicating that this image is a low quality image. In such situations, decision module 140 sends a notification to the user computing device 110 indicating the classification output by network 130 for an image received from the device.

In some embodiments, decision module 140 generates a set of training data for training neural network 130 by performing some augmentation on a plurality of existing images of documents as well as obtaining labeling data from a plurality of users. For example, sever computer system 120 gathers a small set of existing images of documents (e.g., from prior authentication procedures performed by server computer system 120, from a google search, by prompting various users via applications provided by server system 120, etc.). This set of existing images may include 100, 1000, 10,000, etc. images. In some situations, the number of existing images may not be satisfactory for training purposes. In such situations, server system 120 executes decision module 140 to augment existing images to generate (e.g., 10 times) more images. In other situations, the types of existing images may not be satisfactory for training purposes. For example, existing images may not include enough low-quality examples. As one specific example, there may only be a few images that include a glare spot that covers important user data included in documents shown in these images. In order to thoroughly train neural network 130, it may be desirable that decision module 140 utilize a large number of low-quality image examples.

Decision module 140 may perform, either randomly or with assistance from a system administrator, one or more of the following augmentation operations to augment existing images to generate new image examples for training: image rotation, random cropping, blurring, distorting, and adding glare. For example, decision module 140 may take an existing image and rotate the image 90, 180, 360 degrees clockwise. Using various rotated images during training allows neural network 130 to be trained to identify image quality regardless of the orientation of an image. As another example, decision module 140 may randomly crop portions from existing images to generate partial (low-quality) images for training. Decision module 140 may access a library of algorithms to randomly blur existing images by applying Gaussian blur, motion blur, defocus blur, etc. to generate blurred images for training. Similar algorithms may be used to apply distortion to existing images. Further, decision module 140 may prompt a system administrator to apply partial blurring or glare points to important portions of documents depicted in existing images such as a user's name, address, signature, etc. included in the documents.

As discussed above, in some embodiments, decision module 140 gathers label data for various existing and augmented images in order to determine and assign labels to these images for inclusion in a set of training data. For example, decision module 140 may access images of documents that were previously uploaded to a quality detection system executing traditional quality assessment measures such as a system utilizing human evaluation of image documents. Such images may include labels assigned by a human evaluator indicating, "low quality," "low resolution," "cannot recognize document," "unknown document," etc. In this example, decision module 140 assigns a "low quality" classification to these images for use in training neural network 130.

Decision module 140 may additionally send existing images of documents (or augmented images of documents) to a set of users (e.g., 10, 20, 30 software developers associated with the disclosed quality detection system) prompting them to label these images as quality or not quality based on a specific quality standard. In this example, the prompt to these users may specify the quality standard as: if a human eye can identify and extract key information from an image of a document, then label this image as quality. Further in this example, if a threshold number of users label the image as quality (e.g., 2 or more users), then decision module 140 assigns a label of quality to this image for use in training neural network 130. In some embodiments, in addition to prompting users for labels, during training of the network 130, decision module 140 generates classifications for images sent to the users, letting them know how the neural network 130 is currently classifying this image. In this way, users may be able to make an informed decision when selecting a different label than the classification output by network 130 (i.e., users are able to see if they are altering the training of neural network).

In some embodiments, server computer system 120 is a risk detection system, a customer relationship management system, an online transaction processing (OLTP) platform, etc. or any combination thereof. For example, server computer system 120 may facilitate the opening and management of private user accounts for conducting their business, online transactions, credit card applications, loan applications, etc. In order to onboard, identify, authenticate, etc. users, server computer system 120 may request identification information from these users for authentication purposes, for example. System 120 may utilize decision module 140 in combination with an extraction module to determine whether images of documents satisfy a quality threshold and then extract information from documents depicted in high quality images.

The disclosed techniques may advantageously allow a risk detection system to more quickly evaluate various users requesting authentication. For example, the disclosed image quality assessment system may identify whether imperfections within an image are covering important information included in a document depicted within the image. As a result, the disclosed techniques may advantageously result in a smaller number of rejected images, which in turn may result in a better end user experience while still maintaining a high level of security (users will still be quickly authenticated via the use of information extracted from high-quality images).

Note that various examples herein classify images of documents during a quality assessment process, but these examples are discussed for purposes of explanation and are not intended to limit the scope of the present disclosure. In other embodiments, any of various objects depicted within images may be assessed for quality during a quality assessment process using the disclosed techniques. In this disclosure, various "modules" operable to perform designated functions are shown in the figures and described in detail (e.g., decision module 140). In some embodiments, neural network 130 may be referred to as a machine learning module. As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC.

Example Images of Documents

FIG. 2 is a diagram illustrating example images of documents. In the illustrated embodiment, seven example images 200 are shown. Images 202-214 include various examples of imperfections that may block or obscure important information included in a driver's license depicted in these images.

Image 202, in the illustrated embodiment, is a low resolution image (e.g., 320 pixels×240 pixels) that is also blurry. For example, the text and picture included in the driver's license depicted in image 202 are blurry and difficult to read in addition to the image being low resolution. In contrast, image 204 is a high resolution image, but includes a glare point over a portion of the text included in the driver's license. Image 206 is blurry and includes blocked content. For example, the user who captured image 206 accidently placed their thumb over a portion of the license while they were capturing the image). Image 208 also includes a glare point, but it does not cover the text or the face of the user shown in the picture on the driver's license. Image 210, in the illustrated embodiment, includes two different objects that are blocking portions of the driver's license depicted in the image, but these objects do not block the content of the license. Image 212 is a high resolution image, but is blurry. Image 214 captures a partial document. As yet another example, an image may not include a document at all. That is, a user might point their phone's camera in the wrong direction and miss capturing an image of their driver's license entirely).

The example images 200 shown in FIG. 2 may be evaluated using the disclosed techniques to determine whether imperfections within these images render these images useless for authentication and, thus, should be rejected by a risk detection system. For example, the disclosed techniques identify blur, glare points, reflections, low resolution, blocked content, partial documents, or missing documents. In addition, the disclosed techniques will identify whether such example imperfections obscure important document information. For example, the disclosed techniques label image 204 as low quality, while image 208 is labeled as high quality (since the glare in image 204 obscures important information, while the glare in image 208 does not).

Example User Computing Device

Figure 3:
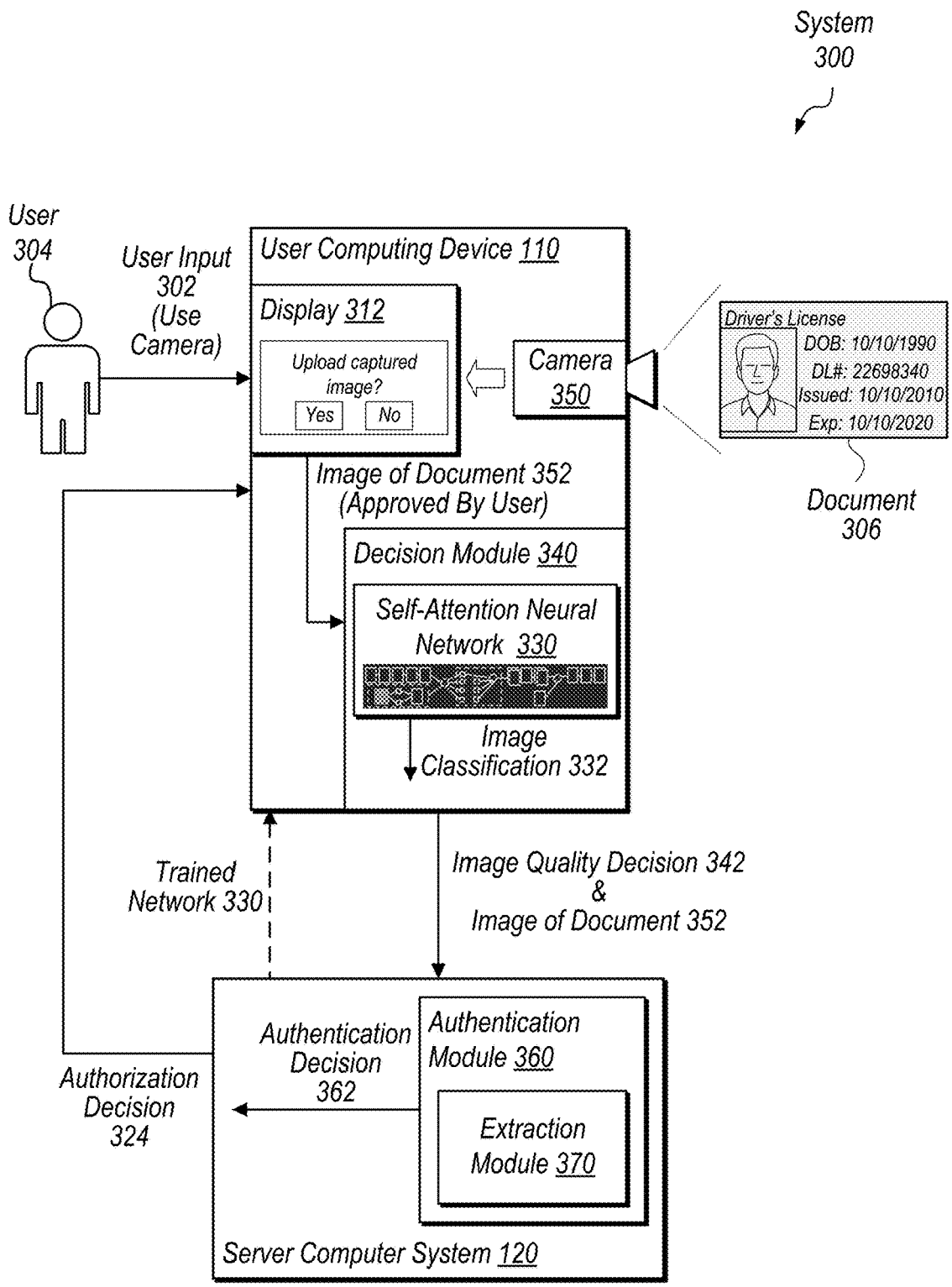
FIG. 3 is a block diagram illustrating an example user computing device configured to both capture an image of a document and determine whether images of documents satisfy a quality threshold, according to some embodiments.

FIG. 3 is a block diagram illustrating an example user computing device configured to both capture an image of a document and determine whether images of documents satisfy a quality threshold. In the illustrated embodiment, system 300 includes user computing device 110 and server computing system 120. User computing device 110 in turn includes display 312, camera 350, and decision module 340. System 300 may perform similar operations to the operations discussed above with reference to FIG. 1, but a larger portion of these operations are performed at user computing device 110 instead of at server computer system 120.

In the illustrated embodiment, user computing device 110 includes decision module 340, which in turn includes a self-attention neural network 330. Self-attention neural network is one example of the neural network 130 shown in FIG. 1 and executed by server computer system 120. For example, neural network 330 may be a CNN that includes a self-attention block, several convolutional layers, and an inception block, as discussed in further detail below with reference to FIG. 4. In the illustrated embodiment, user 304 captures image 352 of document 306 via camera 350 and approves the image for quality assessment. In response to the user uploading the image, decision module 340 inputs the image into network 330 for classification. Neural network 330 outputs a classification 332 for image 352 and decision module 340 transmits an image quality decision 342 and the image 352 of document 306 to server computer system 120. For example, image quality decision 342 indicates whether or not image 352 satisfies a quality threshold.

As discussed above with reference to FIG. 1, based on class probabilities output by a trained neural network, the disclosed decision module makes a determination whether this value meets a quality threshold. In some situations, this threshold may be set by a system administrator or may be selected based on a consensus from several end users based on example images and classifications output by the neural network for these images. For example, if the quality threshold is selected to be 0.9, then an image receiving a classification of 0.95 may satisfy this quality threshold and be labeled as "quality" by decision module 340. In other situations, the quality threshold is built in to neural network 330. Said another way, the output of neural network 330 may be a binary classification of either "quality" or "not quality." Based on a binary classification value of "not quality" being output by the neural network 330 for a given image, decision module 340 sends a notification to the user computing device 110 notifying the user that the given image has been rejected, for example. In contrast, if the image classification 332 output by network 330 indicates that the image is low quality, decision module 340 may prompt user 304 via display 312 to upload a new, higher quality image of document 306.

In some embodiments, user computing device 110 trains neural network 330. In other embodiments, server computer system 120 trains neural network 330 and transmits the trained network to user computing device 110 for execution on the device. In still other embodiments, user computing device 110 trains neural network 330 and then periodically sends the trained network 330 to server computing system 120 for training, evaluation, and modification. For example, while user computing device 110 may train the neural network 330, server computing system 120 may monitor the catch rate of the network and may perform additional remedial training of the network when necessary before sending the retrained network back to device 110 for execution.

In some embodiments, user computing device 110 may be a 5G device. For example, user computing device 110 is configured to train and/or execute neural network 330 using 5G capabilities. The disclosed neural network is advantageously executable via the user computing device 110 due to 5G capabilities of mobile devices. For example, device 110 may implement at any of various frequency bands extending through 5G and beyond, which may provide for more quick and reliable execution of neural network 330 relative to other network communication methods. In addition, because the disclosed neural network (discussed in detail below with reference to FIG. 4) is advantageously executable by user computing device 110 because the neural network is faster and has more condensed layers than traditional neural networks. Execution of all or a portion of the disclosed techniques (e.g., training and/or execution of neural network 330) at an edge device (e.g., user computing device 110) is made possible by the increase in throughput and bandwidth provided by edge devices having 5G capabilities. Edge computing may, in turn, allow for federated machine learning (e.g., all or a portion of the training for neural network 330 is performed at user computing devices). For example, performance of various tasks that were previously performed at a server at edge computing devices may be referred to as mobile edge computing (MEC). As some specific examples, the disclosed machine learning may be performed at edged devices using various network communication methods, including satellite-, cellular-, Wi-Fi-based, etc. frequencies of communication. Such edge computing may advantageously increase security of authentication procedures. For example, authentication procedures performed for a user based on user data extracted from images uploaded at an edge device may be performed more quickly than images evaluated using traditional techniques at a server, for example. Increasing the speed at which an authentication process is performed may advantageously allow security systems to identify and prevent fraudulent activity.

As discussed in further detail below with reference to FIG. 4, the disclosed neural network is faster than traditional neural network architectures such as the residual neural network (ResNet) or the inception neural network (InceptionNet). For example, traditional neural networks are often large and require a large amount of computational resources (GPU, memory, etc.) as well as a larger amount of time to execute. As such, traditional networks often do not meet the performance requirements (e.g., quick execution times specified in service-level agreements) for quality assessment and risk detection systems. For example, in order to maintain an excellent end user experience, backend image evaluation (such as that performed at block 650 in FIG. 6) must complete within seconds or even milliseconds (e.g., less than 100 milliseconds). In some situations, the bulky nature and slower speeds of traditional networks are due to the thousands of classes of objects that the networks are trained on via millions of images included in the ImageNet database, for example. In contrast, the disclosed neural network is trained to output two different classifications (e.g., quality image or non-quality image) for approximately five object classes (e.g., blur, glare, low-resolution document, partial document, and non-document).

Server computer system 120, in the illustrated embodiment, includes authentication module 360, which in turn includes extraction module 370. Authentication module 360 executes extraction module 370 to extract information from the document depicted in image 352 based on the image quality decision 342 indicating that this is a quality image. In some embodiments, the extracting is performed using a computer vision model, such as optical character recognition (OCR), facial recognition algorithms, etc.

Authentication module 360, in the illustrated embodiment, generates an authentication decision 362 based on the extracted information. Server computer system 120 transmits the authentication decision 324 to user computing device 110. In some embodiments, user computing device 110 displays an authentication decision to user 304 via display 312. For example, as discussed in further detail below with reference to FIG. 6, a PayPal™ application executing on the user computing device 110 may display a success message (at block 680) to the user indicating that their identity has been successfully verified based on analysis of an identification document uploaded by the user.

Example Neural Network

Figure 4:
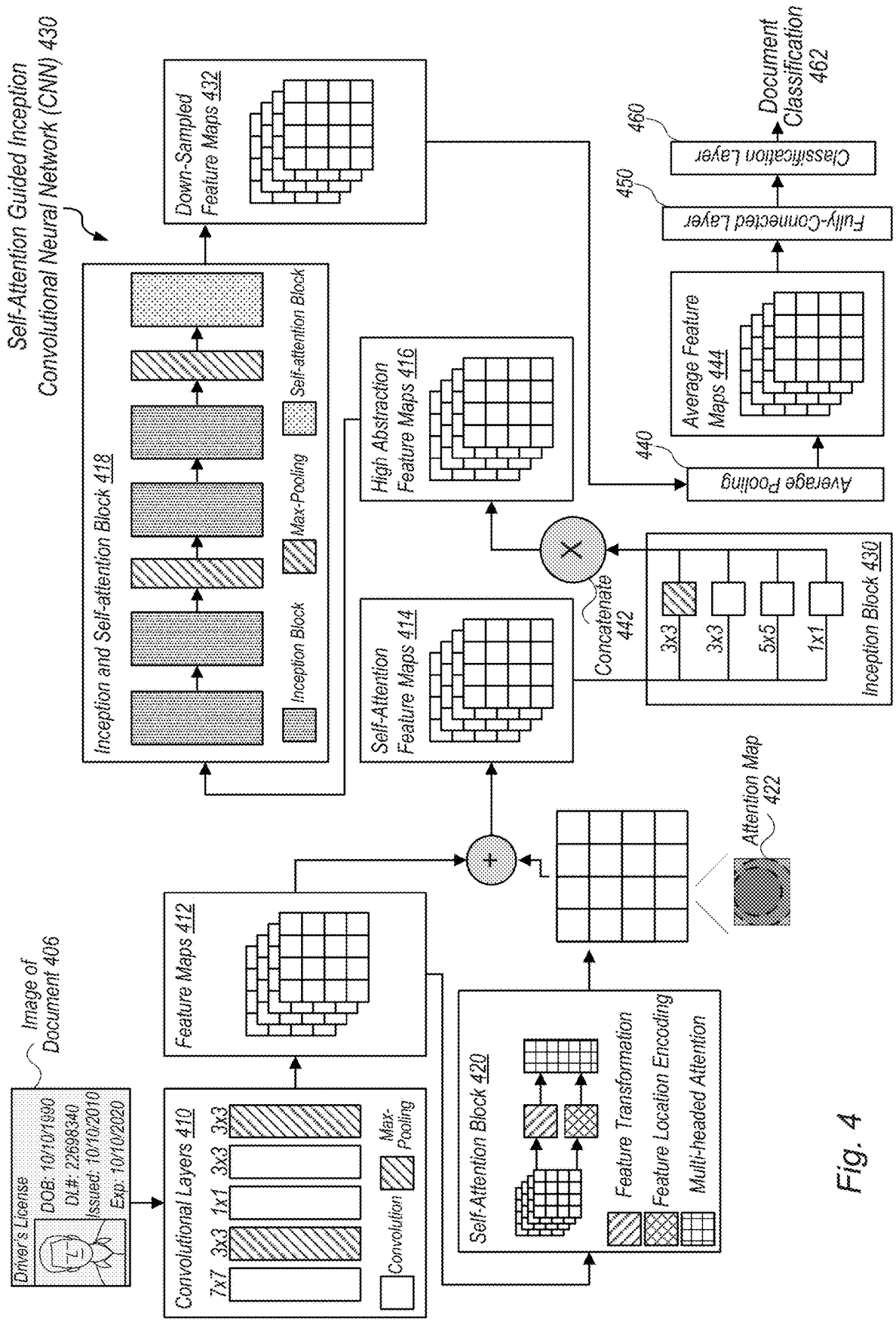
FIG. 4 is a block diagram illustrating an example self-attention guided inception convolutional neural network (CNN), according to some embodiments.

FIG. 4 is a block diagram illustrating example self-attention guided inception convolutional neural network (CNN). In the illustrated embodiment, self-attention guided inception CNN 430 includes convolutional layers 410 and 418, self-attention block 420, and inception block 430, as well as a fully-connected layer 450, and a classification layer 460. The various different blocks included in self-attention guided inception CNN 430 enable the disclosed quality detection system to identify if imperfections (e.g., glare, blur, object, etc.) in an image are covering up or obscuring important information (e.g., text, a picture, etc.) included in documents. For example, the inception portions of CNN 430 extract a primary set of features from image 406 and then the self-attention portions of the CNN cause the network to place greater weight on a subset of these primary features (e.g., text, a picture of a user's face, etc.) within a document depicted in the image that are considered important due to these features being used for an authentication process.

The following description for FIG. 4 is discussed with reference to the classification of image 406 of a document. In other situations, however, a set of training images, such as those as discussed above with reference to FIG. 3, may be input into the neural network depicted in FIG. 4 during a training process. For example, these training images may pass through the same blocks and layers as image 406, but during training of the network these blocks and layers may be adjusted based on document classifications that are output by the network and are compared with known labels of these training images.

In the illustrated embodiment, an image 406 of a document in into a block of convolutional layers 410 of self-attention guided inception CNN 430. In some embodiments, prior to inputting an image 406 of a document into the neural network depicted in FIG. 4, the server computer system 120 shown in FIG. 1 preprocesses the image. For example, system 120 may shrink the size of the image to a predetermined size and a predetermined number of color dimensions. As one specific example, system 120 may shrink the image to be a size 512 pixels (width) by 512 pixels (height) by 3 pixels (color (e.g., red, blue, green (RGB))).

In the illustrated embodiment, the image 406 of a document is send through the convolutional layers 410. First, image 406 is fed into a 7×7 convolutional layer, followed by a 3×3 max-pooling layer, followed by a 1×1 convolutional layer, followed by a 3×3 convolutional layer, finally followed by a 3×3 max-pooling layer. The 7×7 convolutional layer includes 32 filters and extracts small features such as noise within in image. The output of the 7×7 convolutional layer is input to a 3×3 max-pooling layer of stride 2, which in turn outputs a set of 256×256×32 feature maps (e.g., 512 pixels divided by 2 results in 256 pixels). The following convolutional layers extract additional features from the output of previous layers at a higher level of abstraction. For example, the next 1×1 convolutional layer includes 32 filters and the 3×3 convolutional layer includes 64 filters. The output of the 3×3 convolutional layer is then fed into an additional max-pooling layer with a stride of two which shrinks the feature map to a size of 128×128. While FIG. 4 includes a specific number of convolutional and max-pooling layers, note that any of various numbers of such layers may be included in convolutional layers 410. Further, the number of filters included in each layer may be adjusted.

In the illustrated embodiment, the output of convolutional layers 410 is a set 412 of feature maps. The set 412 of feature maps output by convolutional layers 410 are then input into self-attention block 420. For example, the set 412 of feature maps is input into both a feature transformation layer and a feature location encoding layer included in self-attention block 420, the output of which are respectively input into a multi-headed attention layer. In various embodiments, the self-attention block 420 calculates an attention weight map 422 of the feature map. The self-attention block 420 may identify, for example, text within an image of a document (e.g., similar to natural language processing) and observes the context of various words or phrases based on the content close to such words within the document in order to place greater "attention" on important text, such as text to be used to authenticate a user.

As one specific example of applying self-attention, the disclosed neural network will not only identify a picture of a user's face in a document, but will also determine if there is text around the picture such as an identification number, name, address, etc. The self-attention block 420 accomplishes this attention by using one-dimensional positional encoding. For example, features extracted by the convolutional layers 410 will be assigned a location coding that is generated from its position within the image 406. This positional encoding (i.e., attention map 422) is then added (using matrix operations) to features within the set 412 of feature maps to determine attention weights for respective features i.e., set 414 of self-attention feature maps. For example, the identification number in a document may be assigned greater weight than a signature field within the document. The positional encoding performed at self-attention block 420 may increase the classification accuracy of CNN 430 by 3%, 4%, 5%, etc. for example.

In the illustrated embodiment, the set 412 of self-attention feature maps (the combination of the set 412 of feature maps and the attention map 422) are input into an inception block 430. The inception modules included in inception block 430 scale features extracted from image 406 on an higher level of abstraction than at convolutional layers 410. Inception block 430 includes a max-pooling layer with a stride of two (to further shrink the size of feature maps included in set 414), a 3×3, a 5×5, and a 1×1 convolutional layer stacked together horizontally. The output of these layers is concatenated at 442 to generate a set 416 of high abstraction feature maps. While the inception block 430 shown in FIG. 4 is one example of the layers that might be included in neural CNN 430, in other situations any of various types of layers of various sizes may be included in the inception block.

In the illustrated embodiment, the set 416 of high abstraction feature maps output by inception block is input into inception and self-attention block 418. Block 418 includes four inception blocks, two max-pooling blocks, and a self-attention block. The output of block 418 is a set 432 of down-sampled feature maps. As discussed above with reference to convolutional layers 410, the inception block, max-pooling layer, and self-attention block included in block 418 may be altered during training to meet computational needs (e.g., self-attention layers are computationally intensive and slow). The self-attention block included in block 418 computes weights on a down-sampled feature map output by the inception blocks and max-pooling layer to generate the set 432 of down-sampled feature maps.

In the illustrated embodiment, the set 432 of down-sampled feature maps is input into an average pooling layer 440. The average pooling layer 440, for example, may calculate average values for portions of feature maps included in the set 432 of down-sampled feature maps. The set 444 of average feature maps output by average pooling layer 440 is input into a fully-connected layer 450 that includes 512 neurons. The output of the fully-connected layer 450 is then input into a classification layer 460. For example, classification layer 460 may be a soft-max layer that outputs a classification in the form of two-value vector, the first value indicating the probability of a first classification and the second value indicating the probability of a second classification. As one specific example, a vector [0.9, 0.1] ([quality image, not quality image]) output by classification layer 460 indicates that the image 406 is likely a quality image. In some embodiments, the output of classification layer 460 is a binary classification. For example document classification 462 might be a value of either 0 (indicating quality document) or 1 (indicating not a quality document).

Turning now to FIG. 5, a diagram is shown illustrating example portions of a document depicted in an image identified as including features for use in an authentication process. In the illustrated embodiment, image 206, also depicted in FIG. 2 and discussed in detail above, is shown on the left, while an attention map 510 version of image 206 is shown on the right. For example, the attention map 510 of image 206 shows the portions of the driver's license depicted in the image that include important information (i.e., the picture of the user's face and the text of the driver's license that includes DOB, license number, and issued and expiration dates). The disclosed neural network may generate such a heat map when determining which features in an image are important and should not be blocked or obscured in order to determine if image 206 is a high quality image. In this example, neural network will determine that image 206 is not a quality image because an object is blocking features included in the attention map 510 (e.g., a heat map).

FIG. 5 further includes an image 214 of a partial document and a corresponding attention map 512 version of the image 214. In the illustrated embodiment, attention map 512 of image 214 shows portions of a driver's license depicted in the image that include important information (even though some of the text for the license is cut off by the image). As discussed above, in some situations, an attention map is generated for an image; however, such attention maps may not be generated for each prediction output by the model for images. For example, an attention map may be generated on-demand in order to determine why the neural network output a given decision (prediction) for a given image.

Example Image Quality Detection

Figure 6:
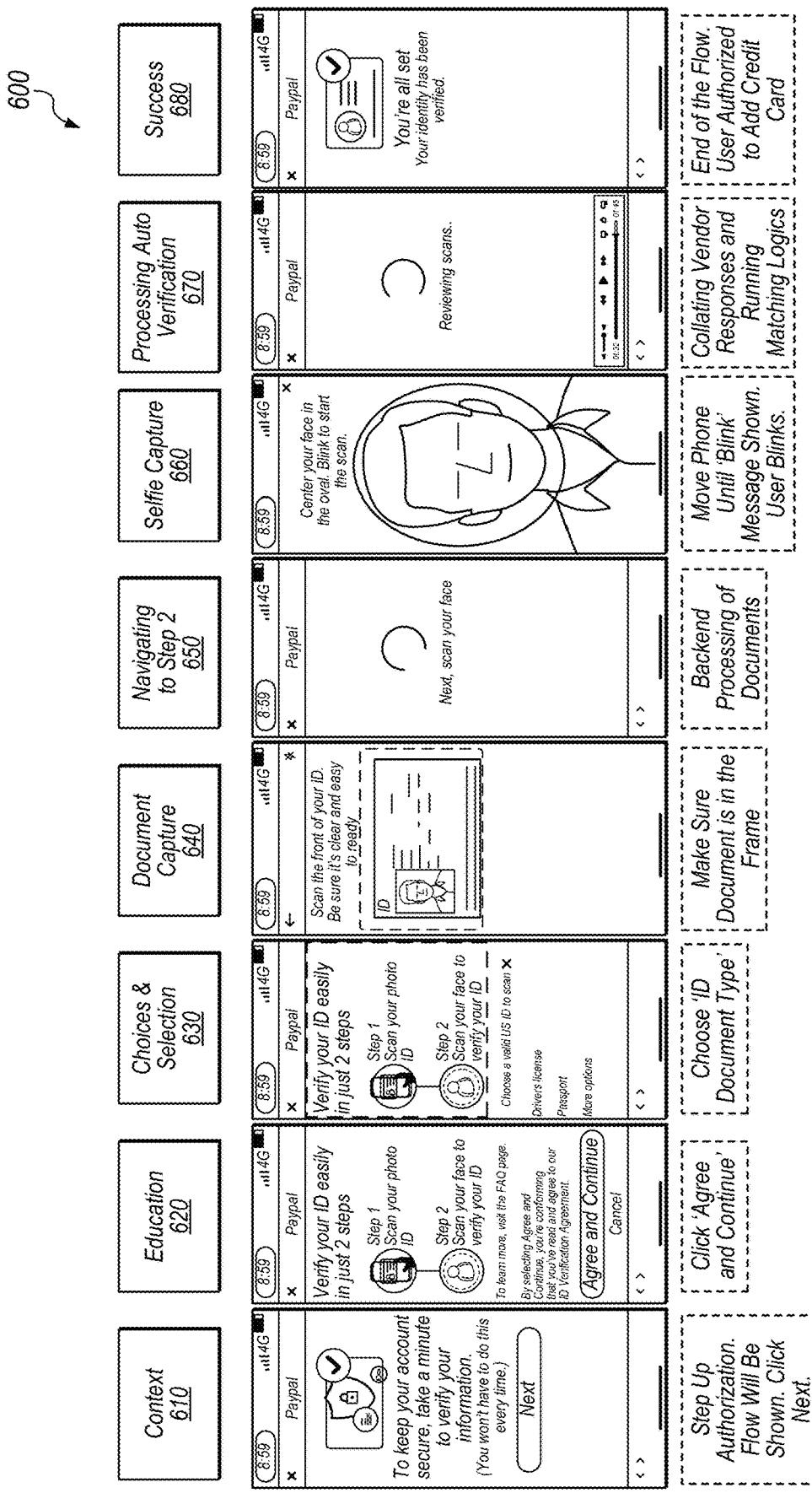
FIG. 6 is a diagram illustrating a detailed example of an image quality assessment process, according to some embodiments.

FIG. 6 is a diagram illustrating a detailed example of an image quality assessment process. In the illustrated embodiment, example flow 600 shows the screen of a user's phone at several different steps prior to initiating an online transaction with an OLTP system (e.g., with PayPal). Blocks 610-680, in the illustrated embodiment, show the user interface displayed to a user accessing the OLTP system in order to verify their identity and add their credit card information for use in online transactions.

In the illustrated embodiment, an OLTP application displays, via a user's phone screen at context block 610, a verification prompt to the user requesting that they confirm their identity. In order to initiate the verification process, the user clicks the "Next" button and their phone screen now displays the interface shown at education block 620. At block 620, the application instructs the user on uploading documentation in order to verify their identity. Once the user has read the instructions shown in the interface, they can either click the "Cancel" button to terminate the verification process or can click the "Agree and Continue" button to proceed to the next user interface shown at the choices and selection block 630. The interface shown at block 630 allows the user to select a type of identification document to scan for the verification process.

Once the user selects a document type, the user interface at block 640 prompts to the user to capture an image of the document they selected for identity verification. In response to the user capturing an image of their ID at block 640, the application displays a processing user interface at block 650 to show that the system is navigating to the next step in the verification process (e.g., the system is determining whether the image of the ID uploaded by the user meets a quality threshold). At block 660, the user captures an image of their face by facing the camera on their phone and blinking to capture the image. At block 670, the application performs an automatic verification process by analyzing the ID and the user's image captured at block 660. At block 680, the application shows the user that their identity has successfully been verified and that they are now authorized to add their credit card or other forms of payment information to their account for use in online transactions.

Example Method

FIG. 7 is a flow diagram illustrating a method for determining whether an image of a document satisfies a quality threshold, according to some embodiments. The method 700 shown in FIG. 7 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In some embodiments, method 700 is performed by server computer system 120. In other embodiments, method 700 is performed by user computing device 110.

At 710, in the illustrated embodiment, a server computer system receives an image of a document captured at a user computing device. For example, the image may be a picture of a passport.

At 720, the server computer system analyzes, using a neural network, the image to determine whether the image satisfies a quality threshold, where the analyzing includes determining whether one or more features in the image used in an authentication process are obscured. In some embodiments, the analyzing includes identifying whether the image includes one or more of the following: a blur, a glare, a reflection, an obstructing object, a partial document, a low-resolution document, an invalid document, a partial document, and no document.

In some embodiments, prior to the analyzing, training, by the server computer system, the neural network using a set of training data generated by performing one or more image augmentation operations of the following augmentation operations on a set of existing images of documents: rotating, cropping, blurring, distorting, and adding a glare. In some embodiments, the set of training data includes both the set of existing images of documents and a set of augmented images generated as a result of performing the one or more image augmentation operations. In some embodiments, the set of training data is further generated by labeling respective images in the set of training data, where the labeling includes displaying, to a plurality of users via respective user interfaces, images included in the set of training data. In some embodiments, the labeling further includes receiving, from the plurality of users via the respective user interfaces, suggested labels for the images, where the labels specify a binary quality classification for the image. In some embodiments, the training further includes assigning, based on comparing a total number of different types of suggested labels and a consensus threshold, final labels for the images.

In some embodiments, prior to the analyzing, the server computer system trains the machine learning model using a set of training data generated by augmenting images included in a set of existing images of documents. In some embodiments, the server computer system then assigns, based on binary classifications for images in the set of existing images and the augmented images received from a plurality of users, labels to respective ones of the augmented images and images in the set of existing images.

In some embodiments, the neural network includes at least one self-attention block for generating a set of attention weight maps from a set of features extracted from the image, where the set of attention weight maps indicates the one or more features in the image to be used in the authentication process. In some embodiments, the neural network further includes a convolutional block for extracting features from the image to generate a set of feature maps for the image and at least one inception block for extracting features from the image at a higher level of abstraction than the convolutional block to generate a set of down-sampled high abstraction feature maps. In some embodiments, the neural network further includes a second self-attention block for generating a set of attention weight maps from the set of down-sampled high-abstraction feature maps. In some embodiments, the neural network is a convolutional neural network (CNN), where the neural network includes a fully connected layer with a plurality of neurons for processing the set of down-sampled high-abstraction feature maps prior to generating a binary classification for the image via a classification layer.

At 730, the server computer system transmits, to the user computing device, a quality result, where the quality result is generated based on an image classification output by the neural network. In some embodiments, the quality result transmitted to the user computing device indicates that a classification output by the neural network specifies that the image does not meet a quality threshold and prompts a user of the user computing device, via a user interface of the device, to submit a new, higher quality document image.

In some embodiments, in response to the image classification output by the neural network indicating a quality image, the server computer system extracts one or more features to be used in the authentication process, where the extracting is performed using a computer vision model. In some embodiments, the server computer system performs the authentication process using the one or more extracted features. In some embodiments, prior to inputting the image into the machine learning model, the server computer system preprocesses the image of the document, including shrinking a size of the image to a predetermined size and a predetermined number of color dimensions.

In some embodiments, the elements of method 700 are performed by a user computing device (e.g., user computing device 110) instead of server computer system 120. For example, determining whether an image satisfies a quality threshold is performed by the user computing device via execution of a neural network that is trained at the user computing device. In other embodiments, the server computer system is configured to both train and execute the neural network for the image quality determination. In some embodiments, the user computing device is configured to train the neural network by implementing the 5G standard. The disclosed neural network is trained to identify portions of a document depicted in an image that include information relevant to performing an authentication procedure. Such tailored detection may advantageously improve the processing speed of the neural network when evaluating the quality of images of documents. In some situations, this may also advantageously reduce or prevent private user data from being unnecessarily extracted from images of documents and stored or shared when it is not being used for an authentication process.

Example Computing Device

Figure 8:
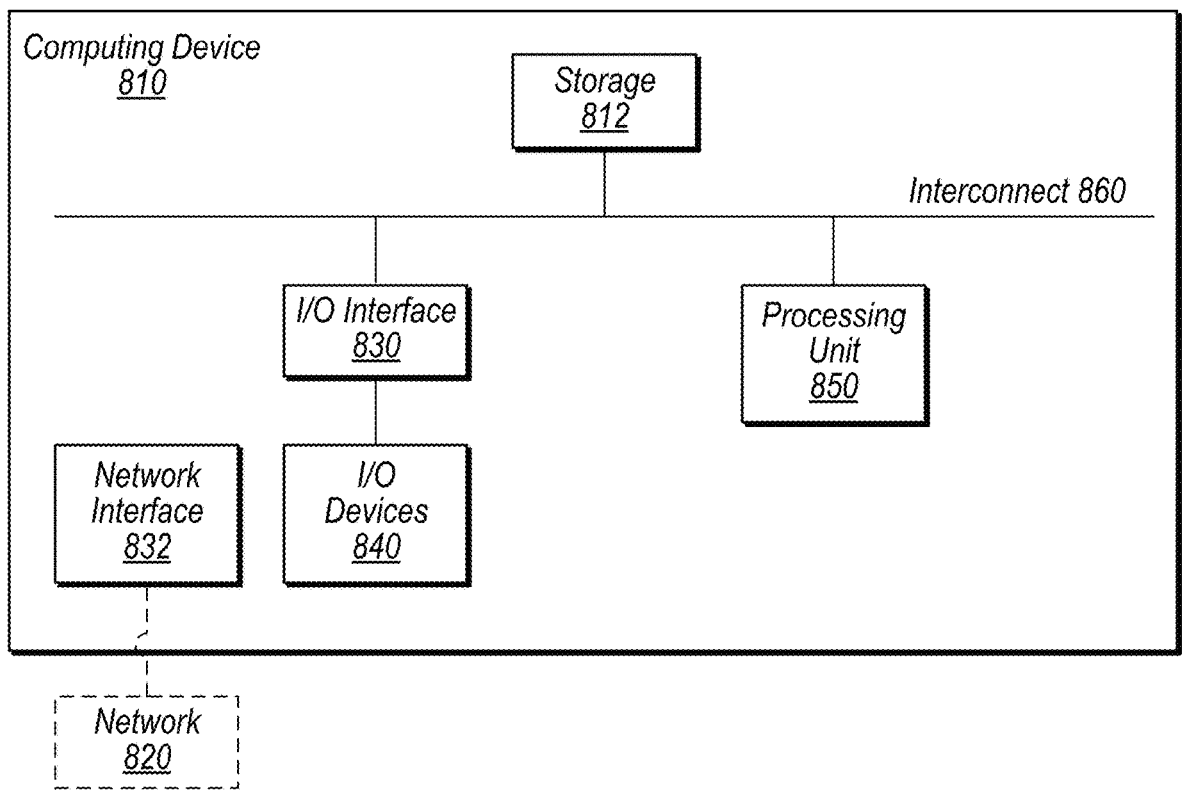
FIG. 8 is a block diagram illustrating an example computing device, according to some embodiments.

Turning now to FIG. 8, a block diagram of one embodiment of computing device (which may also be referred to as a computing system) 810 is depicted. Computing device 810 may be used to implement various portions of this disclosure. Computing device 810 (one example of user computing device 110 or server computer system 120) may be any suitable type of device, including, but not limited to, a personal computer system, desktop computer, laptop or notebook computer, mainframe computer system, web server, workstation, or network computer. As shown, computing device 810 includes processing unit 850, storage 812, and input/output (I/O) interface 830 coupled via an interconnect 860 (e.g., a system bus). I/O interface 830 may be coupled to one or more I/O devices 840. Computing device 810 further includes network interface 832, which may be coupled to network 820 for communications with, for example, other computing devices.

In various embodiments, processing unit 850 includes one or more processors. In some embodiments, processing unit 850 includes one or more coprocessor units. In some embodiments, multiple instances of processing unit 850 may be coupled to interconnect 860. Processing unit 850 (or each processor within 850) may contain a cache or other form of on-board memory. In some embodiments, processing unit 850 may be implemented as a general-purpose processing unit, and in other embodiments it may be implemented as a special purpose processing unit (e.g., an ASIC). In general, computing device 810 is not limited to any particular type of processing unit or processor subsystem.

Storage subsystem 812 is usable by processing unit 850 (e.g., to store instructions executable by and data used by processing unit 850). Storage subsystem 812 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 812 may consist solely of volatile memory, in one embodiment. Storage subsystem 812 may store program instructions executable by computing device 810 using processing unit 850, including program instructions executable to cause computing device 810 to implement the various techniques disclosed herein.

I/O interface 830 may represent one or more interfaces and may be any of various types of interfaces configured to couple to and communicate with other devices, according to various embodiments. In one embodiment, I/O interface 830 is a bridge chip from a front-side to one or more back-side buses. I/O interface 830 may be coupled to one or more I/O devices 840 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:
   receiving, by a server computer system, an image of a document captured at a user computing device;
   analyzing, by the server computer system using a neural network, the image to determine whether the image satisfies a quality threshold, wherein the analyzing using the neural network includes:
   extracting, via an inception portion of the neural network, a primary set of user identifying features from the image;
   selecting, via a self-attention portion of the neural network, a subset of the primary set of user identifying features from the image to be weighted greater than other user identifying features in the set of user identifying features; and
   determining, via a classification portion of the neural network based on the weighting of the subset of user identifying features, whether one or more of the subset of user identifying features in the image used in a user authentication process are obscured; and
   transmitting, by the server computer system to the user computing device, a quality result, wherein the quality result is generated based on an image classification output by the neural network.

2. The method of claim 1, wherein the neural network includes at least one self-attention block in the self-attention portion for generating a set of attention weight maps from a set of features extracted from the image, and wherein the set of attention weight maps indicates the one or more user identifying features in the image to be used in the user authentication process.

3. The method of claim 2, wherein the neural network further includes a convolutional block that extracts features from the image to generate a set of feature maps for the image and at least one inception block that extracts features from the image at a higher level of abstraction than the convolutional block to generate a set of down-sampled high-abstraction feature maps.

4. The method of claim 3, wherein the neural network further includes a second self-attention block that generates a set of attention weight maps from the set of down-sampled high-abstraction feature maps.

5. The method of claim 3, wherein the neural network is a convolutional neural network (CNN), and wherein the neural network includes a fully connected layer with a plurality of neurons that processes the set of down-sampled high-abstraction feature maps prior to generating a binary classification for the image via a classification layer.

6. The method of claim 1, wherein the analyzing includes identifying whether the image includes one or more of the following: a blur, a glare, a reflection, an obstructing object, a partial document, a low-resolution document, an invalid document, and no document.

7. The method of claim 1, further comprising:
   in response to the image classification output by the neural network indicating a quality image, extracting, by the server computer system, one or more features to be used in the user authentication process, wherein the extracting is performed using a computer vision model; and
   performing, by the server computer system using the one or more extracted features, the user authentication process.

8. The method of claim 1, further comprising, prior to the analyzing, training, by the server computer system, the neural network using a set of training data generated by performing one or more image augmentation operations of the following augmentation operations on a set of existing images of documents: rotating, cropping, blurring, distorting, and adding a glare;
   wherein the set of training data includes both the set of existing images of documents and a set of augmented images generated by performing the one or more image augmentation operations.

9. The method of claim 8, wherein the set of training data is further generated by labeling respective images in the set of training data, wherein the labeling includes:
   displaying, to a plurality of users via respective user interfaces, images included in the set of training data;
   receiving, from the plurality of users via the respective user interfaces, suggested labels for the images, wherein the labels specify a binary quality classification for the image; and
   assigning, based on comparing a total number of different types of suggested labels and a consensus threshold, final labels for the images.

10. A non-transitory computer-readable medium having instructions stored thereon that are executable by a server computer system to perform operations comprising:
    receiving an image of a document captured at a user computing device;
    analyzing, using a machine learning model, the image to determine whether the image satisfies a quality threshold, wherein the analyzing using the machine learning model includes:
    extracting, via an inception portion of the machine learning model, a primary set of user identifying features from the image;
    selecting, via a self-attention portion of the machine learning model, a subset of the primary set of user identifying features from the image to be weighted greater than other user identifying features in the set of user identifying features; and
    determining, via a classification portion of the machine learning model based on the weighting of the subset of user identifying features, whether one or more of the subset of user identifying features in the image used in a user authentication process are obscured by one or more imperfections; and transmitting, to the user computing device, a quality result, wherein the quality result is generated based on an image classification output by the machine learning model.

11. The non-transitory computer-readable medium of claim 10 wherein the machine learning model includes at least one self-attention block in the self-attention portion that generates a set of attention weight maps from the subset of user identifying features extracted from the image, and wherein the set of attention weight maps indicates the one or more user identifying features in the image to be used in the user authentication process.

12. The non-transitory computer-readable medium of claim 11, wherein the machine learning model further includes a convolutional block that extracts features from the image to generate a set of feature maps for the image and at least one inception block that extracts features from the image at a higher level of abstraction than the convolutional block to generate a set of down-sampled high-abstraction feature maps.

13. The non-transitory computer-readable medium of claim 10, further comprising, prior to the analyzing, training the machine learning model using a set of training data generated by:

augmenting images included in a set of existing images of documents; and assigning, based on binary classifications for images in the set of existing images and the augmented images received from a plurality of users, labels to respective ones of the augmented images and images in the set of existing images.

14. The non-transitory computer-readable medium of claim 10, wherein the operations further comprise:

prior to inputting the image into the machine learning model, preprocessing the image of the document, including shrinking a size of the image to a predetermined size and a predetermined number of color dimensions.

15. The non-transitory computer-readable medium of claim 10, wherein the analyzing includes identifying whether the image includes one or more of the following: a blur, a glare, a reflection, and an obstructing object.

16. A system, comprising:

at least one processor; and a memory having instructions stored thereon that are executable by the at least one processor to cause the system to:

receive an image of a document captured at a user computing device;

analyze, using a neural network, the image to determine whether the image satisfies a quality threshold, wherein the analyzing using the neural network includes:

extracting, via an inception portion of the neural network, a primary set of user identifying features from the image;

selecting, via a self-attention portion of the neural network, a subset of the primary set of user identifying features from the image to be weighted greater than other user identifying features in the set of user identifying features; and determining, via a classification portion of the neural network based on the weighting of the subset of user identifying features, whether one or more of the subset of user identifying features in the image used in a user authentication process are obscured; and transmit a quality result, wherein the quality result is generated based on an image classification output by the neural network.

17. The system of claim 16, wherein the user computing device is the system, wherein determining whether the image satisfies the quality threshold is performed by the user computing device via execution of the neural network that is trained at the user computing device, and wherein the user computing device is configured to train the neural network by implementing a 5G standard for using 5G cellular technology.

18. The system of claim 16, wherein the system is a server computer system configured to train and execute the neural network.

19. The system of claim 16, wherein the neural network includes at least one self-attention block in the self-attention portion for generating a set of attention weight maps from the subset of user identifying features extracted from the image, and wherein the set of attention weight maps indicates the one or more features in the image to be used in the user authentication process.

20. The system of claim 16, wherein the quality result transmitted to the user computing device indicates that a classification output by the neural network specifies that the image does not meet the quality threshold and prompts a user of the user computing device, via a user interface of the user computing device, to submit a new, higher quality document image that is higher quality than the image of the document captured at the user computing device, wherein image quality is determined at least based on image resolution, wherein the prompt further specifies one or more portions of the image that include imperfections that caused the image to not meet the quality threshold.

* * * * *